United States Patent [19]

Sayler et al.

[11] Patent Number: 4,780,291

[45] Date of Patent: Oct. 25, 1988

[54] PROCESS FOR REMOVING SULFUR GASES FROM A COMBUSTION GAS

[75] Inventors: William H. Sayler, Murray; Justin C. White, Magna, both of Utah

[73] Assignee: TAS, Inc., Magna, Utah

[21] Appl. No.: 8,355

[22] Filed: Jan. 29, 1987

[51] Int. Cl.$^4$ .................. B01J 8/00; C01B 17/00; C01B 17/16; F23B 7/00
[52] U.S. Cl. .................. 423/244; 423/230; 423/242; 110/343
[58] Field of Search .............. 423/242 A, 242 R, 243, 423/244 A, 244 R, 230; 110/343

[56] References Cited

U.S. PATENT DOCUMENTS

| | | | |
|---|---|---|---|
| 2,718,453 | 9/1955 | Beckman | 423/244 |
| 3,781,408 | 3/1972 | Lin | 423/244 |
| 4,273,750 | 6/1981 | Hollett, Jr. et al. | 423/244 |
| 4,350,670 | 9/1982 | Matsuda et al. | 423/244 |
| 4,366,134 | 12/1982 | Korcsy | 423/244 |
| 4,424,197 | 1/1984 | Powell et al. | 423/244 |
| 4,519,995 | 5/1985 | Schrofelbauer et al. | 423/244 |
| 4,531,461 | 7/1985 | Sayler et al. | 110/106 |
| 4,582,005 | 4/1986 | Brown | 110/343 |

FOREIGN PATENT DOCUMENTS 3131959  2/1983  Fed. Rep. of Germany ...... 423/242

OTHER PUBLICATIONS

"The Status of Lime in Stack Gas Scrubbing" by J. Z. Abrams of Bechtel Group, Inc. (May 3–4, 1982).
"The Application of Dry Additives on Reducing $SO_2$ Emission for Brown Coal Fired Boilers" by Klaus R. G. Hein and W. Glaser of Rheinisch-Westfalisches.
"Limestone Injection with an Internally Staged Low $No_x$ Burner" by Joel Vatsky and Edmund S. Schindler of Foster Wheeler Energy Corporation (Nov. 1984).

*Primary Examiner*—Gregory A. Heller
*Attorney, Agent, or Firm*—Trask, Britt & Rossa

[57] ABSTRACT

Solid carbonaceous fuel, such as bituminous coal, is copulverized with a basic metal reactant to provide a microground prepared fuel predominantly in minus 325 mesh particles of high specific surface area. The prepared fuel is fed directly to a burner and effects ninety-five percent (95%) or better removal of the sulfur from the fuel prior to emission.

20 Claims, 1 Drawing Sheet

PROCESS FOR REMOVING SULFUR GASES FROM A COMBUSTION GAS

BACKGROUND OF THE INVENTION

1. Field:

This invention pertains to the treatment of combustion gas to remove sulfur gases. It is particularly directed to the reduction of sulfur emissions from stack gases, and an improved approach to providing finely divided carbonaceous fuel in association with finely divided reactant.

2. State of the Art:

The in situ control of $SO_2$ stack emissions by the injection of reactants (notably calcium-based sorbents) has been actively investigated for many years. Various approaches to flue gas desulfurization are described, for example, in U.S. Pat. Nos. 2,718,453; 3,781,408; 4,273,750; 4,350,670; 4,366,134; and 4,424,197. Each of these patents, the disclosures of which are incorporated herein by reference, discloses a process whereby a gas containing $SO_2$ is reacted with a reactant to produce a sulfur-containing reaction product which is retained in the cinders, filters or scrubbers of a combustion system.

Recent trends in utility flue gas desulfurization are discussed in an article (incorporated herein by reference) by J. Z. Abrams of Bechtel Group, Inc., entitled "The Status of Lime in Stack Gas Scrubbing" (for presentation at the annual meeting of the National Lime Association, May 3-4, 1982). This article describes the 73 coal-fired power-generating units currently equipped with operational FGD (flue gas desulfurization) systems," about $11\frac{1}{2}\%$ of the coal-fired electrical generating components of the United States of America in 1982. The vast majority of such systems (including all of the commercially operating systems), involved the contact of flue gas with a calcium-based slurry to produce calcium sulfite ($CaSO_3$) and in some cases, a smaller amount of calcium sulfate ($CaSO_4$).

The article, "The Application of Dry Additives on Reducing $SO_2$ Emission for Brown Coal Fired Boilers" by Klaus R. G. Hein and W. Glaser, Rheinisch-Westfalisches Elektrizitatswerks, 4300 Essen, Federal Republic of Germany, discusses a phenomenon known as "natural retention" of sulfuric oxides in the fly ash in combustion systems utilizing solid fossil fuels with high concentrations of basic components (basic metal oxides or their equivalent). The article (incorporated herein by reference) speculates that a catalytic surface reaction MO (M=basic metal)+$SO_2$+$\frac{1}{2}O_2 \rightarrow MSO_4$, occurs during combustion so that a portion of the $SO_2$ gas produced is retained as solid sulfates in the combustion residue. The authors suggest that the same reaction can be used for further $SO_2$ removal if a basic oxide is added. A high specific surface area and/or a high porosity of the metal oxide reactant is recommended. It is postulated that natural retention of in excess of 50% of the $SO_2$ produced may be achieved. It is further suggested that the Ca/S value in the fuel may be increased by the addition of calcium-based materials to the fuel, in some cases prior to grinding. The authors concluded that sulfur retention does not relate directly to $SO_2$ emission and that there is no direct functional correlation between sulfur retention and the Ca/S ratio in the fuel. Nevertheless, they believed that certain Ca/S values needed to be maintained if a maximum $SO_2$-emission was not to be exceeded. Such values were believed to be practical in brown coal but were determined to be inoperative in the case of bitumnous coals because of the phenomenon of "dead burning" of additives.

A paper entitled "Limestone Injection With an Internally Staged Low $NO_x$ Burner" was presented by Joel Vatsky and Edmund S. Schindler of Foster Wheeler Energy Corporation, at the EPA/EPRI First Joint Symposium On Dry $SO_2$ and Simultaneous $SO_2$/NOx Control Technologies in San Diego, Calif., November 1984. This paper (incorporated herein by reference) describes efforts which have been made to decrease sulfur emissions from power plants by injecting pulverized limestone and lixe into the combustion zone of a boiler. It also makes reference to previous efforts to mix limestone with coal, and injecting the mixture into a test furnace. Purportedly, 50% $SO_2$ emission reduction had been obtained by others prior to the work done by Foster Wheeler. The specific work reported on achieved between 40-60% $SO_2$ emission reduction at Ca/S ratios of 2 to 4, utilizing pressurized injection of hydrated lime in a special low $NO_x$ burner. The same level of $SO_2$ emission reduction had been obtained by others with "super fine" sorbent particles (98%-325 mesh) injected through or near the tertiary air ports of the burner. The coal and limestone were pulverized in a Foster Wheeler MBF-16 mill. The tests demonstrated that when the coal and limestone were copulverized, unacceptable levels of $SO_2$ capture were obtained. The postulated explanation for this unsatisfactory sorbent utilization was deadburning of the calcined limestone. To avoid deadburning, Foster Wheeler developed a novel in-burner sorbent control method. This method effected "acceptable" levels of sorbent utilization; i.e., $SO_2$ emission reductions of 50% with limestone sizings equal to that of the coal (91.5%-200 mesh, 100%-50 mesh).

The state of the art prior to this invention has thus been that the retention of $SO_2$ in the ash produced by a burner could be increased by adding basic metal oxide reactants to the solid carbonaceous fuel delivered to a burner, thereby reducing $SO_2$ emission by as much as 60%. The industry has recognized, however, that copulverization of the fuel and the adsorbent (reactant) should be avoided because of the inherent phenomenon of deadburning. Moreover, superfine sizing of the adsorbent wasn't deemed to be necessary or desirable, although high-surface adsorbent was recognized as being more reactive than lower surface area forms of the same material.

There is a growing trend in certain countries, notably the U.S.A., to rely upon coal and petroleum coke as fuels. Large users have made significant progress in controlling sulfur emissions, but through the use of expedients is not practical for smaller users. U.S. Pat. No. 4,531,461 discloses a microfine powdered coal combustion system which is suitable for delivering pulverized coal to the burner systexs typical of smaller users. The system comprises an enclosed coal metering and grinding section which delivers microground coal directly to a burner. The specific surface areas of the xicrofine powder produced by the grinding section (typically —325 mesh) is substantially higher than previously available solid fuel burner fuels. There results an elongated flame similar to an oil flame, characterized by rapid combustion, quick turn-down capability and complete combustion. The ash content of the solid fuel provides an excellent radiation source so that the coal flame and its products of combustion provide better heat transfer than an oil or gas flame of equal heat release rates. The sulfur dioxide emission in the flue gases from this system is less than would be expected based upon the sulfur content of the fuel. The sulfur which is not emitted is retained by the ash, which is removed by various means from the flue gases. Despite the significance of reduction of sulfur emission experienced with this system, unacceptable levels of $SO_2$ emission still occur.

$SO_2$ emission from power plants and other fossil fuel burners remains a significant environmental problem. A need for improved in situ $SO_2$ capture or retention procedures remains.

SUMMARY OF THE INVENTION

According to this invention, combustion gas is treated for the removal of sulfur gases by providing in association with a finely divided carbonaceous fuel productive of those gases, a finely divided basic metal oxide reactant. In contrast to previous treatment methods, however, a fuel mixture is prepared by introducing an admixture of the carbonaceous fuel and the reactant to a grinding chamber of a grinder in respective amounts which effect a selected Ca:S ratio effective to produce a desired sulfur emissions level (i.e., meet a prescribed sulfur emissions standard). The grinder is operated to effect a discharge from the grinder of a "prepared" fuel composition of approximately the selected Ca:S ratio predominating by weight in individual particles sized below about 325 mesh with a surface area greater than ¼ square meter per gram, more preferably above 0.4 square meters per gram. The grinding chamber discharge is introduced, preferably directly, to a burner within a combustion chamber.

As used herein, the term "sulfur gases" is intended to include the sulfur-containing gases emitted from the stacks or exhausts of power plants or the like which burn carbonaceous fuels. These gases typically include $SO_2$ and its formatives, notably $SO_3$.

The term "basic metal oxide reactant" is intended to include the oxides, hydroxides and carbonates of calcium and/or magnesium and admixtures of any of these materials, specifically including such materials as lime, limestone rock, shells, and any other inorganic mineral material, notably oolitic sands and lithium carbonate, which reacts with $SO_2$ in a fashion analogous to the aforelisted materials.

The term "Ca:S ratio" refers to the molar ratio of the alkaline earth metal moiety (calcium and/or magnesium or their equivalents) of the basic metal reactant to the sulfur moiety in the fuel. In a dynamic system, it refers to total pound moles of calcium and magnesium per hour to pound moles of sulfur per hour in the burner feed.

Particle sizes reported in this disclosure by reference to standard mesh sizes (e.g., the Tyler series) are determined in accordance with conventional sieve analysis procedures. Similarly, particle sizes specified in terms of linear dimensions; e.g., "20$\mu$" or "20 micron," should be understood to pass a mesh with square apertures of the specified (e.g., 20$\mu$) length and width.

Surface areas are reported in this disclosure by reference to the "MICROTRAC" method currently used in the industry to determine particle sizes of microsized coal. Surface areas are determined by this method on the basis of area covered by a standard weight of fuel.

To produce the very large surface areas contemplated by this invention, it is necessary to grind the admixture of carbonaceous fuel and basic metal reactant in a grinder capable of producing high surface area particles. In practice, devices such as ball mills are unsatisfactory, producing relatively spherical particles of inadequate surface area. Micro-pulverizing mills, such as that disclosed by U.S. Pat. No. 4,531,461, the disclosure of which is incorporated by reference, have been found to be ideal, and are ideally suited for introducing the prepared fuel mill discharge directly to a burner.

Milling of the carbonaceous fuel and the basic metal reactant in admixture to the small diameter, high surface area particles specified in this disclosure is an important aspect of the invention. It is presently believed that simultaneous grinding, as taught herein, in itself effects a reaction between the fuel and the reactant so that the effective sulfur content of the prepared fuel is actually lower when introduced to the burner than the calculated amount. Whether such a reaction actually occurs or not, the prepared fuel behaves as though its sulfur content has been reduced by virtue of the milling procedure.

According to the preferred embodiments of this invention, the prepared fuel composition is characterized by at least sixty percent (60%) by weight minus 20 microns particle size. Ideally, substantially the entire feed to the burner will be minus 150 microns. In this connection, occasional particles of larger size, which occur unintentionally in the feed, are disregarded as "spurious." The reactants of most common occurrence, and thus of most interest, are the oxides, hydroxides and carbonates of magnesium and/or calcium; notably including calcium carbonate, calcium oxide and magnesium oxide.

The carbonaceous fuel included in the prepared fuel of this invention is most often solid fossil fuel, such as coal, including bituminous coal; and petroleum coke. It is considered desirable that the prepared fuel composition include at least about thirty percent (30%) volatility content. "Volatility content" is determined by mass differences upon controlled heating; for example, in accordance with ASTM D-3175.

As presently contemplated, the prepared fuel composition is burned, and the resulting combustion gases are discharged through a flue system. This system will conventionally include filtering devices, such as a baghouse, to remove particulate emissions. Additional sulfur-reducing reactions often occur as the gases travel through the flue and filtering system. One particularly useful reaction site is the baghouse where combustion gases are brought into contact with previously captured reactive dust. It has been found that $SO_2$ emission is reduced substantially by cooling the combustion gases to below about 1700° F. prior to discharge to the atmosphere.

The Ca:S ratio of the prepared fuel may be adjusted to meet a desired sulfur emission standard. In practice, maximum sulfur removal occurs at Ca:S ratios of approximately 3:1, use of a significantly lower ratio results in greater emission levels. Significantly higher ratios, e.g., in the range of 5:1 can result in unacceptably high fusion of the ash. The practical range of Ca:S ratios for use in the practice of this invention is presently regarded as between about 2 and 5, preferably above 2.5 and below about 4.

BRIEF DESCRIPTION OF THE DRAWINGS

In the drawings, which illustrate that which is presently regarded as the best mode for carrying out the invention.

DESCRIPTION OF THE ILLUSTRATED EMBODIMENTS

Figure 1:
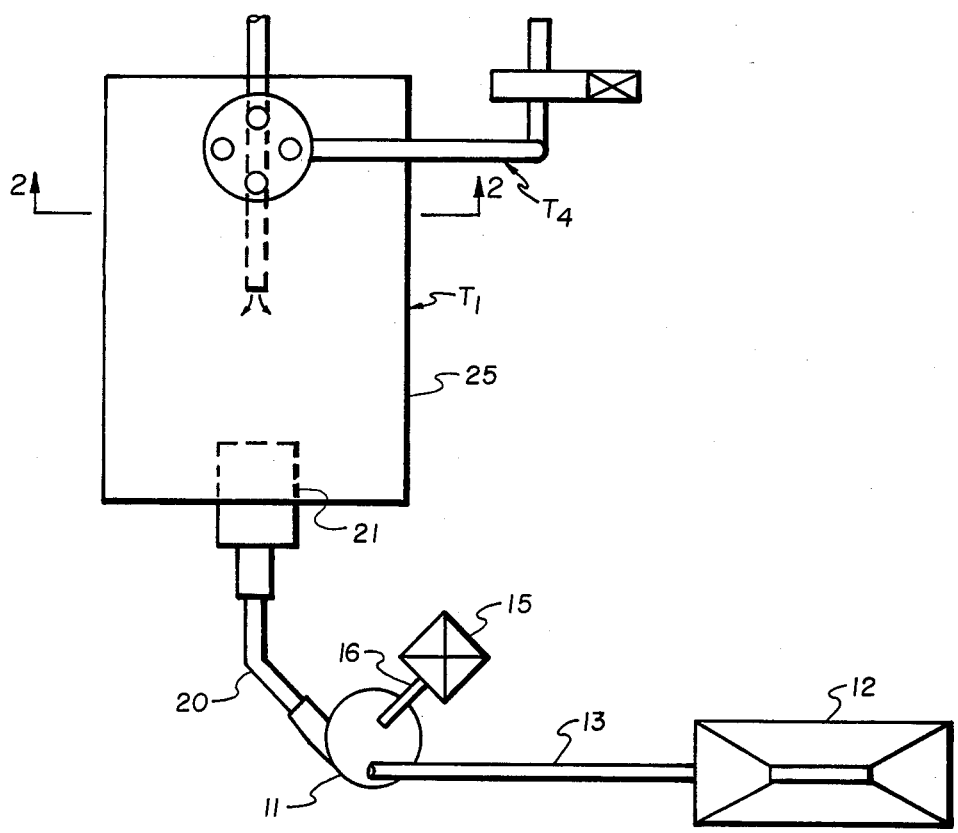
FIG. 1 is a schematic illustration of a pilot plant embodying the invention.
Figure 2:
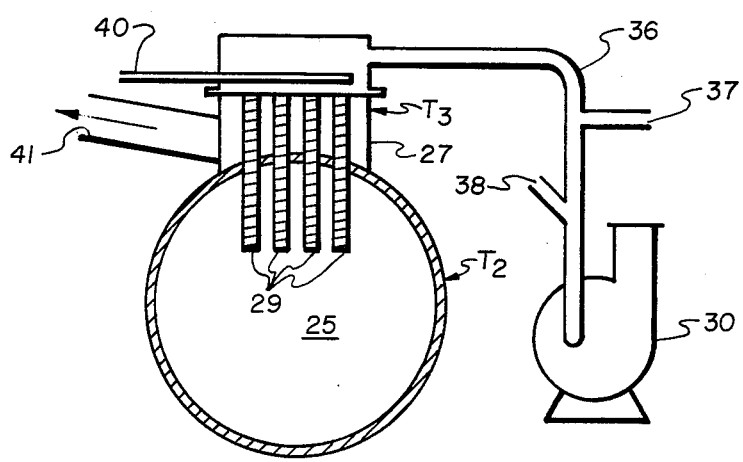
FIG. 2 is a schematic illustration of a portion of the pilot plant of FIG. 1 taken at the section line 2—2.

As illustrated by FIGS. 1 and 2, a pilot plant is constructed around a 24 inch T.A.S. rotary coal mill 11 of the type disclosed by the aforementioned U.S. Pat. No. 4,531,461, the disclosure of which is incorporated by reference. Solid fuel (coal or petroleum coke) is introduced to a coal hopper 12 by means of a front-end loader (not shown) and is delivered from the hopper 12 to the mill 11 through a variable speed screw conveyor 13. Additives (basic metal reactants) are introduced to a hopper 15, from which they are delivered through an adjustable speed feed screw 16 to the mill 11.

Discharge from the mill 11 is via a conveying tube 20 to a burner 21 which maintains a flame within a test chamber 25. The chamber 25 is shown as a cylindrical metal pipe connected to a baghouse section 27 (best shown by FIG. 2). Flue gases may be pulled through high temperature bags 29 of the baghouse 27 by means of a fan 30 through piping 36 which provide a flue gas sampling port 37 and a bleed air supply pipe 38. The baghouse 27 may also be provided with a pulse air pipe 40 and a bypass duct 41, as shown. T1, T2, T3 and T4 designate temperature sensor locations.

A pilot plant of the type illustrated is useful for testing various solid fuel/basic metal reactant combinations. The Ca:S ratio in a prepared fuel can be adjusted by selection of additives (reactants) and grind rates. Table 1 reports typical solid fuels within contemplation, and Table 2 reports typical basic metal reactant additives.

TABLE 1

| Solid Fuel | Weight Percent Analysis | | | BTU Content Per Pound |
|---|---|---|---|---|
| | Moisture | Ash | Sulfur | |
| A | 5.25 | 0.39 | 2.82 | 14,591 |
| B | .74 | 1.28 | 2.63 | 13,663 |
| C | .07 | 0.39 | 4.03 | 13,777 |
| D | 11.5 | 17.95 | 6.3 | 10,830 |

Fuel A is a typical raw peteroleum coke from Houston, TX; Fuels B and C are calcined petroleum cokes from Houston and Chicago, Ill., respectively; and Fuel D is a typical midwestern high-sulfur coal.

TABLE 2

| Reactant | Weight Percent Analysis | | |
|---|---|---|---|
| | Moisture | Ca | Mg |
| 1. Road Base Limestone | 4.45 | 30.77 | 4.09 |
| 2. Chemical Base Limestone | 2.84 | 34.20 | 0.49 |
| 3. Clam Shells | 1.38 | 35.58 | 0.09 |
| 4. Oyster Shells | 5.23 | 29.05 | 1.32 |
| 5. Hydrated Lime (92%) | | 49.76 | |

Table 3 reports the Ca:S ratio in prepared fuels resulting from various grind rates (in pounds per hour) of the fuels of Table 1 and the additives of Table 2 in a mill 11 such as that illustrated in FIGS. 1 and 2.

TABLE 3

| Prepared Fuel No. | Solid Fuel (Table 1) | Fuel Grind Rate Pph | Additive (Table 2) | Additive Grind Rate Pph | Ca:S Ratio |
|---|---|---|---|---|---|
| 1 | A | 161 | None | 0 | |
| 2 | A | 164 | 1 | 108 | 7.008 |
| 3 | A | 197 | 3 | 116 | 5.969 |
| 4 | A | 216 | 4 | 107 | 4.388 |
| 5 | A | 191 | 2 | 100 | 5.20 |
| 6 | C | 369 | None | 0 | |
| 7 | C | 356 | 2 | 85 | 1.664 |
| 8 | C | 285 | 3 | 66 | 1.647 |
| 9 | C | 281 | 4 | 71 | 1.570 |
| 10 | C | 182 | 1 | 61 | 2.502 |
| 11 | B | 468 | None | 0 | |
| 12 | B | 295 | 1 | 83 | 3.211 |
| 13 | B | 295 | 3 | 80 | 2.947 |
| 14 | B | 288 | 4 | 118 | 3.892 |
| 15 | B | 302 | 2 | 83 | 2.927 |
| 16 | D | 219 | None | 0 | |
| 17 | D | 229 | 2 | 54 | 1.048 |
| 18 | D | 179 | 1 | 60 | 1.597 |
| 19 | D | 171 | 5 | 51 | 1.885 |
| 20 | D | 171 | 3 | 42 | 1.114 |
| 21 | C | 268 | None | 0 | |
| 22 | C | 370 | 2 | 111 | 2.090 |

The specific surface areas and particle side distributions of the prepared fuels reported in Table 3 can vary appreciateably due to the differing physical characteristics of the solid fuels and additives. Particle size distributions can be determined by conventional "Ro Tap" screen analyses supplemented by Coulter Counter techniques to determine the distribution of particles smaller than approximately 40 microns. The mean particle size (on a weight basis) of the prepared fuels of this invention will preferably be less than about 20 microns. Althuough the invention is operable with prepared fuels having somewhat larger mean particle sizes; e.g., as high as about 40 microns, better results are obtained with mean particle sizes within the range of about 10 to about 25 microns. The prepared fuels of this invention are ground sufficiently to pass in excess of about 80 percent by weight a 325 mesh screen. Moreover, grinding is done under conditions which encourage particle-to-particle contact. High specific surface area results. For example, one gram of a typical prepared fuel of this invention will cover approximately ½ square meter [as determined by micro track]. Particle-top-article micropulverization or its equivalent is an important aspect of this invention.

By copulverizing of solid fuel and basic metal reactants under conditions of particle-to-particle contact, to produce microground prepared fuels having a Ca:S ratio increased above that inherent in the solid fuel, and introducing that copulverized "prepared fuel" directly to the firebox, removal of in excess of 99% of the sulfur in the fuel can be effected. Such high removal rates are best achieved by providing for contact of collected ash in the flue system; e.g., in the baghouse 27 by flue gases at temperatures below about 1800° F., preferably below about 1700° F. This invention offers substantial improvement (removal of 95% or more) of the sulfur in the fuel in some instances even without reliance upon a baghouse. Generally, however, the use of a baghouse or similar filtration means will substantially increase the sulfur removal obtainable by the practice of this invention.

Although this invention is directed primarily to solid fuels, it is applicable to systems in which liquid fuels; e.g., fuel oils, are burned along with the solid fuels.

Better flame stability is often experienced when a small portion; e.g., about 5 to about 15 percent by weight of the prepared fuel consists of fuel oil, particularly when the solid fuel (e.g., petroleum coke) is low in volatile content. Excellent flame characteristics and stability are achieved when the prepared fuel has a minimum volatility content of approximately 30% by weight. Fuel oil is considered a volatile substance for the purpose of determining the volatility content of a prepared fuel.

Reference herein to details of certain preferred or illustrated embodiments is not intended to limit the scope of the appended claims, which themselves recite the features regarded as important to the invention.

We claim:

1. An improved process which includes treating combustion gas for removal of sulfur gases by providing in association with a finely divided carbonaceous fuel productive of said combustion gas a finely divided basic metal oxide reactant prior to combustion of said fuel, the process comprises:
   introducing an admixture of said fuel and said reactant to a pulverizer in respective amounts which effct a Ca:S ratio effective to meet a desired sulfur emissions standard;
   copulverizing said admixture in said pulverizer which reduces said admixture to a prepared fuel composition of approximately said Ca:S ratio predominating by weight in individual particles sized below about 325 mesh with a surface area greater than ¼ square meters per gram; and
   introducing said prepared fuel composition to a burner within a combustion chamber.

2. An improved process according to claim 1 wherein said prepared fuel composition is charaterized by at least sixty percent (60%) by weight minus 20 micron particle size.

3. An improved process according to claim 1 wherein said reactant is selected from the group consisting of the oxides, hydroxides and carbonates of either calcium or magnesium or both, including admixtures of any of said oxides, hydroxides and carbonates.

4. An improved processss according to claim 1 wherein the prepared fuel composition is fed directly to said burner, and the rate of introduction of said admixture to said polyerizer is selected to provide said discharge at a preselected rate to said burner.

5. An improved process to claim 4 wherein said carbonaceous fuel is a solid fossil fuel.

6. An improved process according to claim 5 wherein said reactant is selected from the group consisting of the oxides, hydroxides and carbonates of either calcium or magnesium or both, including admixtures of any of said oxides, hydroxides and carbonates.

7. An improved process according to claim 6 wherein said prepared fuel composition predominates by weight in minus 20 micron particle size material.

8. An improved process according to claim 1 wherein said combustion gas is cooled to below about 1700° F. prior to discharge to the atmosphre.

9. An improved process according to claim 8 wherein the prepared fuel composition is fed directly to said burner, and the rate of introduction of said admixture to said pulverizer is selected to provide said discharge at a preselected rate to said burner.

10. An improved process according to claim 9 wherein said carbonaceous fuel is a solid fossil fuel.

11. An improved process according to claim 10 wherein said reactant is selected from the group consisting of the oxides, hydroxides and carbonates of either calcium or magnsesim or both, including admixtures of any of said oxides, hydroxides and carbonates.

12. An improved process according to claim 11 wherein said prepared fuel composition predominates by weight in minus 20 micron particle size material.

13. An improved process according to either of claims 5 or 10 wherein said fuel includes at least about 30 percent (30%) by weight volatility content.

14. An improved process of which includes treating a combustion gas for the removal of sulfur gases by providing in association with finely divided carbonaceous fuel productive of said combustion gas a finely divided basic metal oxide reactant prior to combustion of said fuel, the process comprising copulverizing said fuel and said reactant under conditions of particle-to-particle contact to produce a microground prepared fuel composition with a mean particle diameter of less than about 25 microns, an effective surface area greater than ¼ square meter per gram and a Ca:S ratio greater than that of the carbonaceous fuel.

15. An improved process according to claim 14 wherein said prepared fuel predominates in particle size below about 325 mesh and includes at least sixty percent (60%) by weight minus 20 micron particle size.

16. An improved process according to claim 14 wherein said prepared fuel has a volatility content of at least about thirty percent (30%) by weight.

17. An improved process according to claim 14 wherein said prepared fuel is burned and the combustion gases thereby produced are cooled to below about 1700° F. prior to discharge to the atmosphere.

18. A process for removing sulfur gases from combustion gas produced by the combustion of carbonaceous fuel having at least about 30% by weight volatility content, said process comprising:
   admixing carbonaceous fuel with basic metal oxide
   copulverizing the admixture of said carbonaceous fuel and basic metal oxide in a pulverizer which utilizes particle-to-particle contact to reduce said admixture to a prepared fuel composition of approximately said Ca:S ratio predominating by weight in individual particles sized below about 325 mesh with a surface area greater than ½ square meter per gram; and
   introducing said grinding chamber discharge to a burner within a combustion chamber.

19. A process according to claim 18 wherein said prepared fuel composition is characterized by at least 60% by weight particle size less than 20 microns.

20. A process according to claim 19 wherein said pulverizer utilizes a staged impeller.

* * * * *